(12) United States Patent
Li (10) Patent No.: US 11,011,170 B2
(45) Date of Patent: May 18, 2021

(54) SPEECH PROCESSING METHOD AND DEVICE

(71) Applicants: ZHEJIANG GEELY HOLDING GROUP CO., LTD., Hangzhou (CN); ZHEJIANG GEELY AUTOMOBILE RESEARCH INSTITUTE CO., LTD., Taizhou (CN)

(72) Inventor: Shufu Li, Hangzhou (CN)

(73) Assignees: ZHEJIANG GEELY HOLDING GROUP CO., LTD., Hangzhou (CN); ZHEJIANG GEELY AUTOMOBILE RESEARCH INSTITUTE CO., LTD., Taizhou (CN)

( * ) Notice: Subject to any disclaimer, the term of this patent is extended or adjusted under 35 U.S.C. 154(b) by 100 days.

(21) Appl. No.: 16/335,245

(22) PCT Filed: Sep. 20, 2017

(86) PCT No.: PCT/CN2017/102502
§ 371 (c)(1),
(2) Date: Mar. 20, 2019

(87) PCT Pub. No.: WO2018/054309
PCT Pub. Date: Mar. 29, 2018

(65) Prior Publication Data
US 2019/0251972 A1  Aug. 15, 2019

(30) Foreign Application Priority Data

Sep. 22, 2016  (CN) .......................... 201610841160.8

(51) Int. Cl.
*G10L 15/22* (2006.01)
*G10L 15/26* (2006.01)
(Continued)

(52) U.S. Cl.
CPC ............ *G10L 15/22* (2013.01); *G06F 40/166* (2020.01); *G06F 40/216* (2020.01); *G10L 15/26* (2013.01);
(Continued)

(58) Field of Classification Search
CPC ..... G10L 15/22; G10L 15/1822; G10L 15/30; G10L 13/00; G10L 15/08; G10L 15/16;
(Continued)

(56) References Cited

U.S. PATENT DOCUMENTS 9,002,708 B2 *  4/2015  Lee .......................... G10L 15/22
                                                   704/251
10,388,274 B1 *  8/2019  Hoffmeister ...... G06F 16/24522
(Continued)

FOREIGN PATENT DOCUMENTS

CN  101593076 A  12/2009
CN  102141889 A  8/2011
(Continued)

*Primary Examiner* — Vijay B Chawan
(74) *Attorney, Agent, or Firm* — Cheng-Ju Chiang (57) ABSTRACT

The present invention provides a speech processing method, which includes: receiving speech information; recognizing the speech information to convert the speech information into a plurality of pieces of text information; displaying at least one pieces of the text information; and receiving a selection signal to respond according to selected text information. The present invention further provides a speech processing device. According to the speech processing method and device provided by embodiments of the present invention, a user can select and confirm by clicking on displayed text information after the speech information is recognized, so that the selected text information is guaranteed to be coincident with a received speech information, (Continued)

thus further increasing accuracy and convenience of the speech processing and providing the user with a good experience effect.

14 Claims, 3 Drawing Sheets

(51) Int. Cl.
*G06F 40/166* (2020.01)
*G06F 40/216* (2020.01)
*G10L 15/00* (2013.01)

(52) U.S. Cl.
CPC ...... *G10L 15/005* (2013.01); *G10L 2015/221* (2013.01)

(58) Field of Classification Search
CPC ..... G10L 15/18; G10L 15/1815; G10L 15/24; G10L 15/26; G10L 15/32; G10L 2015/0631; G10L 2015/223; G06F 40/295; G06F 40/35; G06F 16/24522; G06F 16/3347; G06F 40/216; G06N 3/0445; G06N 3/0454; G06N 3/0472; G06N 3/08; G06N 7/005
USPC ....... 704/235, 251, 200, 231, 233, 243, 260, 704/270
See application file for complete search history.

(56) References Cited

U.S. PATENT DOCUMENTS

| | | | | |
|---|---|---|---|---|
| 10,504,512 | B1 * | 12/2019 | Sarikaya | ................ G06F 40/35 |
| 2003/0050779 | A1 | 3/2003 | Riis et al. | |
| 2006/0224386 | A1 * | 10/2006 | Ikegami | ................. G10L 13/00 704/260 |
| 2006/0293889 | A1 * | 12/2006 | Kiss | ........................ G10L 15/22 704/235 |
| 2007/0100635 | A1 * | 5/2007 | Mahajan | ................. G10L 15/22 704/276 |
| 2007/0208567 | A1 * | 9/2007 | Amento | ................... G10L 15/22 704/270 |
| 2011/0010174 | A1 * | 1/2011 | Longe | .................... G10L 15/24 704/235 |
| 2012/0290303 | A1 * | 11/2012 | Lee | ........................ G10L 15/22 704/251 |

FOREIGN PATENT DOCUMENTS

| | | |
|---|---|---|
| CN | 102158664 A | 8/2011 |
| CN | 102867511 A | 1/2013 |
| CN | 103531197 A | 1/2014 |
| CN | 103645876 A | 3/2014 |
| CN | 103677729 A | 3/2014 |
| CN | 103956169 A | 7/2014 |
| CN | 105096953 A | 11/2015 |
| CN | 105446495 A | 3/2016 |
| CN | 106251869 A | 12/2016 |
| CN | 107342075 A | 11/2017 |
| JP | S61-84771 A | 4/1986 |
| JP | H11-175091 A | 7/1999 |
| JP | 2003-202886 A | 7/2003 |
| JP | 2006-146008 A | 6/2006 |
| WO | 2015/151157 A1 | 10/2015 |

\* cited by examiner

SPEECH PROCESSING METHOD AND DEVICE

CROSS REFERENCE TO RELATED APPLICATION

The present application is a 35 U.S.C. § 371 National Phase conversion of International (PCT) Patent Application No. PCT/CN2017/102502, filed on Sep. 20, 2017, which is based on and claims priority of Chinese patent application No. 201610841160.8, filed on Sep. 22, 2016. The entire disclosure of the above-identified application is hereby incorporated by reference herein and made a part of this specification.

FIELD OF THE INVENTION

The present invention relates to the field of speech recognition technology, and more particularly to a speech processing method and device.

BACKGROUND OF THE INVENTION

Speech recognition technology is a high-tech technology that can correctly recognize human speech through the machine and convert vocabulary content in human speech into a corresponding computer readable and writable text or command. With the continuous progress of science and technology, speech recognition technology is becoming more and more extensive. Speech recognition technology is more user-friendly than other input methods such as keyboard input, so it will become one of the most important human-computer interaction technologies.

However, the biggest problem with the speech input method in prior art is that the recognition speed in the speech processing is not fast and the accuracy is not high. Although the problem of low recognition speed has been gradually resolved, but because of the existences of similar words in a language and a variety of languages and other reasons, the problem of low accuracy has been unable to solve, which affects the user experience and cannot meet the user speech input requirements.

SUMMARY OF THE INVENTION

Therefore, the present invention provides a speech processing method capable of improving the accuracy and convenience of speech processing, and also capable of giving the user a good experience effect.

An embodiment of the present invention provides the speech processing method, which includes: receiving speech information; recognizing the speech information to convert the speech information into a plurality of pieces of text information; displaying at least one pieces of the text information; and receiving a selection signal to respond according to selected text information.

Specifically, a step of receiving a selection signal to respond according to the selected text information includes: acquiring a selected text in each piece of text information; and sorting the selected text according to a preset rule to obtain the selected text information.

Specifically, a step of displaying at least one piece of text information includes: comparing the plurality of pieces of text information to obtain different words or characters that are recognized from same speech; respectively calculating weight scores of the words or characters to select words or characters with a highest weight score; and displaying a piece of text information comprising all of the words or characters with the highest weight score, and highlighting the words or characters with the highest weight score.

Specifically, the step of displaying at least one piece of text information further includes: receiving a trigger signal for a highlighted word or character; displaying a word or character recognized from the same speech with the highlighted word or character according to the trigger signal; and receiving the selection signal and replacing the highlighted word or character with a selected word or character to obtain the selected text information.

Specifically, a weight processing is performed on the words or characters based on at least one item of a frequency of occurrence, a time of occurrence, an authority of source, whether a common word, whether a dialect and whether a number, to obtain the weight scores of the words or characters.

An embodiment of the present invention further provides a speech processing device, which includes: a receiving module, for receiving speech information; a speech recognition module, for recognizing the speech information to convert the speech information into a plurality of pieces of text information; a display module, for displaying at least one pieces of the text information; and a text input module, for receiving a selection signal to respond according to selected text information.

Specifically, the text input module includes: an acquisition unit, for acquiring a selected text in each piece of text information; and a first text processing unit, for sorting the selected text according to a preset rule to obtain the selected text information.

Specifically, the display module includes: a second text processing unit, for comparing the plurality of pieces of text information to obtain different words or characters that are recognized from same speech and respectively calculating weight scores of the words or characters to select words or characters with a highest weight score; and a first display unit, for displaying a piece of text information including all of the words or characters with the highest weight score, and highlighting the words or characters with the highest weight score.

Specifically, the text input module includes: a receiving unit, for receiving a trigger signal for a highlighted word or character; a second display unit, for displaying words or characters recognized by the same speech with the highlighted word or character according to the trigger signal; and a third text processing unit, for receiving the selection signal and replacing the highlighted word or character with a selected word or character to obtain the selected text information.

Specifically, a weight processing is performed on the words or characters based on at least one item of a frequency of occurrence, a time of occurrence, an authority of source, whether a common word, whether a dialect and whether a number, to obtain the weight score of the word or character.

According to the speech processing method and device provided by the embodiments of the present invention, the user can select and confirm by clicking on a displayed text information after the speech information is recognized, so that the selected text information is guaranteed to be coincident with the received speech information, thus further increasing the accuracy and convenience of the speech processing and providing the user with a good experience effect.

To make the above and other objectives, features and advantages more clearly understood, preferred embodiments are exemplified below, and the details are described as follows with a reference of drawings.

DETAILED DESCRIPTION OF PREFERRED EMBODIMENTS

The technical solutions in the embodiments of the present invention will be described in the following with reference to the accompanying drawings in the embodiments of the present invention. Obviously, the described embodiments are merely part of the present invention and are not all of the embodiments. All other embodiments obtained by those of ordinary skill in the art without making creative work are within the scope of the present invention, based on embodiments in the present invention.

Figure 1:
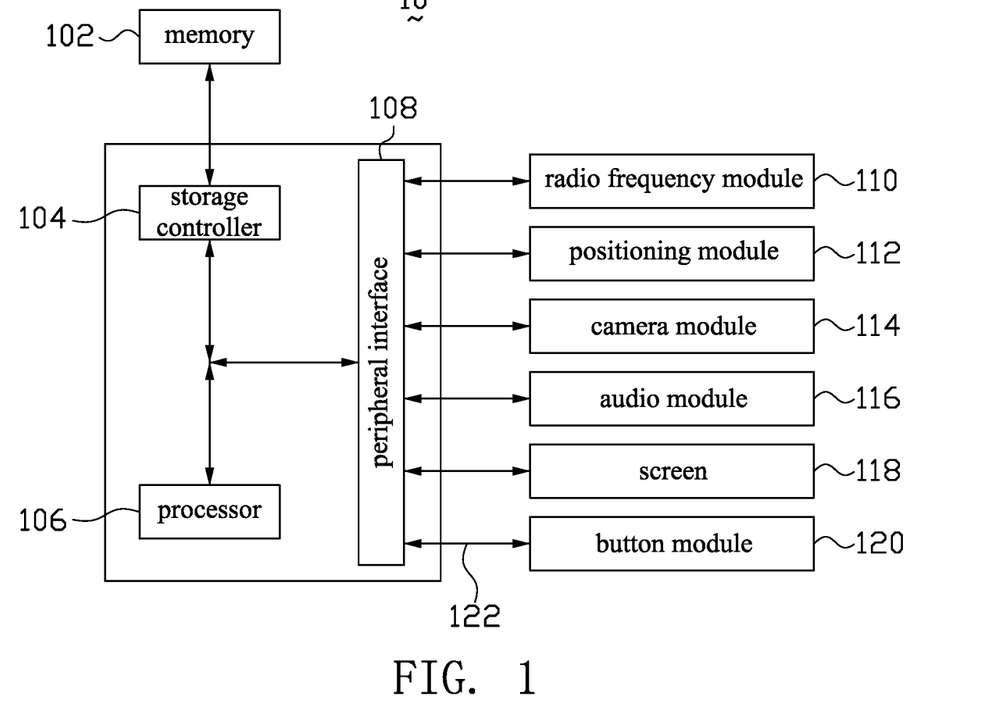
FIG. 1 shows a structural block diagram of a terminal.

FIG. 1 shows a structural block diagram of a terminal. The present invention provides a speech processing method and device which can be applied to a terminal as shown in FIG. 1. As shown in FIG. 1, the terminal 10 includes a memory 102, a storage controller 104, one or more processors 106 (only one is shown in the figure), a peripheral interface 108, a radio frequency (RF) module 110, a positioning module 112, a camera module 114, an audio module 116, a screen 118 and a button module 120. These components communicate with each other through one or more communication buses/signal lines 122.

It is understood that the structure shown in FIG. 1 is only schematic. The terminal 10 may include more or fewer components than that shown in FIG. 1 or have a different configuration than that shown in FIG. 1. Each of the components shown in FIG. 1 may be implemented in hardware, software or a combination thereof.

The memory 102 may be used for storing software programs and modules, such as the program instructions/modules corresponding to the speech processing method and device in the embodiments of the present invention. The processor 106 executes various functional applications and data processing by running the software programs and modules stored in the storage controller 104, thus implementing the aforementioned speech processing method and device.

The memory 102 may include a high speed random access memory, and may also include a nonvolatile memory such as one or more magnetic storage devices, flash memories or other nonvolatile solid state memories. In some examples, the memory 102 may further include a memory that is remotely provided with respect to the processor 106 and may be connected to the terminal 10 over a network. Examples of the aforementioned networks include, but are not limited to, the Internet, the intranet, the local area network (LAN), the mobile communication network and the combinations thereof. The access of the processor 106 and other possible components to the memory 102 may be performed under the control of the storage controller 104.

The peripheral interface 108 couples various input/output devices to the CPU and the memory 102. The processor 106 runs various software and instructions within the memory 102 to perform various functions and data processing of the terminal 10.

In some embodiments, the peripheral interface 108, the processor 106 and the storage controller 104 may be implemented in a single chip. In other embodiments, they can be implemented in separate chips.

The radio frequency module 110 is used for receiving and transmitting electromagnetic waves to realize the mutual conversion of the electromagnetic wave and the electric signal so as to communicate with the communication network or other equipment. The radio frequency module 110 may include various existing circuit elements for performing these functions, such as an antenna, a radio frequency transceiver, a digital signal processor, an encryption/decryption chip, a subscriber identity module (SIM) card, a memory, etc. The radio frequency module 110 may communicate with various networks such as the Internet, the intranet, the wireless network, or communicate with other equipment over a wireless network. The aforementioned wireless network may include a cellular telephone network, a wireless local area network or a metropolitan area network. The aforementioned wireless networks may use various communication standards, protocols and techniques including, but not limited to, global system for mobile communication (GSM), enhanced data GSM environment (EDGE), wideband code division multiple access (W-CDMA), code division access (CDMA), time division multiple access (TDMA), Bluetooth, wireless fidelity (WiFi) (such as IEEE 802.11a, IEEE 802.11b, IEEE802.11g and/or IEEE 802.11n), voice over internet protocol (VoIP), worldwide interoperability for microwave access (Wi-Max), other protocols for mail, instant messaging and text messaging, and any other suitable communication protocols, and even protocols that are not yet developed.

The positioning module 112 is used for acquiring the current position of the terminal 10. Examples of positioning modules 112 include, but are not limited to, global positioning system (GPS) and positioning technology based on wireless local area networks or mobile communication networks.

The camera module 114 is used for taking pictures or videos. The captured picture or video may be stored in the memory 102 and may be transmitted via the radio frequency module 110.

The audio module 116 provides the user with an audio interface that may include one or more microphones, one or more loudspeakers and an audio circuit. The audio circuit receives the sound data from the peripheral interface 108, converts the sound data into electrical information, and transmits the electrical information to the speaker. The loudspeaker converts electrical information into sound waves that can be heard by the human ear. The audio circuit also receives electrical information from the microphone, converts the electrical signal into sound data, and transmits the sound data to the peripheral interface 108 for further processing. The audio data may be acquired from the memory 102 or through the radio frequency module 110. In addition, the audio data may be stored in the memory 102 or transmitted through the radio frequency module 110. In some examples, the audio module 116 may also include an earphone broadcast hole for providing an audio interface to the earphone or other device.

The screen 118 provides an output interface between the terminal 10 and the user. Specifically, the screen 118 displays video output to the user, and the contents of the video output may include text, graphics, video, and any combination thereof. Some output results correspond to some user interface objects. It is understood that the screen 118 may also include a touch screen. In addition to displaying the video output to the user, the touch screen also receives user input, such as the gestures of user clicking, sliding, etc. so that the user interface object responds to the inputs of the user. The technique of detecting user input may be based on a resistive, capacitive, or any other possible touch detection technique. Specific examples of touch screen display units include, but are not limited to, liquid crystal displays or light emitting polymer displays.

The button module 120 also provides an interface for the user to input to the terminal 10, and the user can press the different buttons to cause the terminal 10 to perform different functions.

First Embodiment

Figure 2:
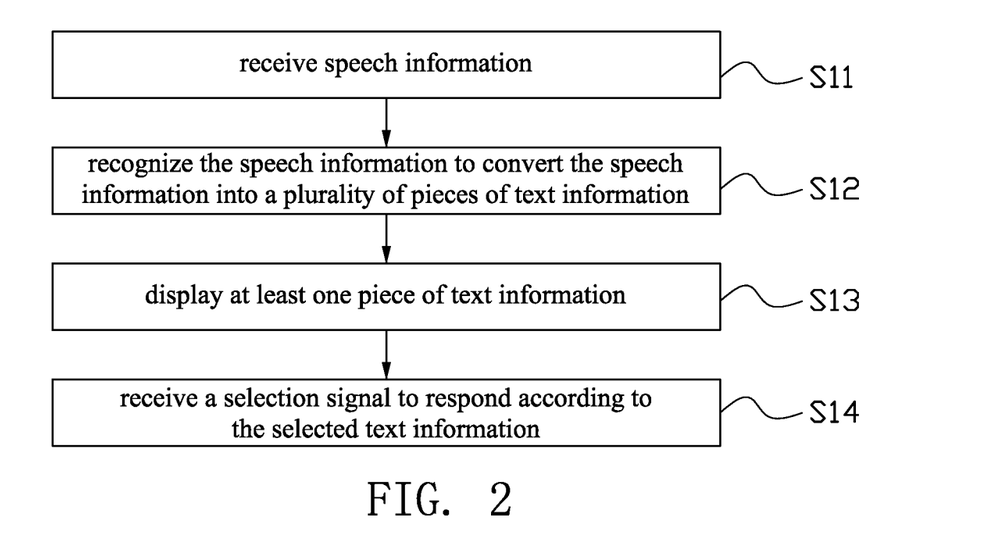
FIG. 2 is a flowchart of a speech processing method provided by the first embodiment of the present invention.

FIG. 2 is a flowchart of a speech processing method provided by the first embodiment of the present invention. The present embodiment is a speech processing method performed by a speech processing device. As shown in FIG. 2, the speech processing method of the present embodiment may include the following steps:

Step S11: receive speech information.

Specifically, the speech processing device operating in the terminal may receive the speech information inputted by the user via a microphone or other speech input device. Wherein, the terminal may be electronic equipment with speech input function such as a personal computer, a notebook computer, a tablet computer, an e-book, a smart phone and a smart watch. The terminal may also be an e-book reader, a moving picture experts group audio layer III or dynamic image compression standard audio expert level 3 (MP3) player, a moving picture experts group audio layer IV or dynamic image compression standard audio expert level 4 (MP4), a lap top portable computer and a desktop computer. Of course, it is understood by those skilled in the art that the speech information received by the speech processing device operating in the first terminal may also be the speech information transmitted from the second terminal to the first terminal or the speech information downloaded and temporarily stored by the first terminal over the network server, but it is not limited thereto.

Step S12: recognize the speech information to convert the speech information into a plurality of pieces of text information.

Specifically, the speech processing device, after receiving the speech information, recognizes the speech information by the speech recognition technology to convert the speech information into a plurality of pieces of text information. Specifically, in one embodiment, the speech processing device communicates with a cloud server, and the speech processing device, when converting the speech information into a plurality of pieces of text information, acquires words or characters related to the speech information from a large database stored in the cloud server to form the plurality of pieces of text information. Wherein, the large database records all the information of newspapers, magazines and websites, thus making the thesaurus in the large database more abundant. Of course, it is understood by those skilled in the art that the words or characters related to the speech information may also be directly stored in the speech processing device.

Step S13: display at least one piece of text information.

Specifically, the speech processing device displays at least one piece of text information through the display module. In one embodiment, the speech processing device displays all of the pieces of text information obtained by converting the speech information, his but it is not limited thereto. For example, in another embodiment, the speech processing device may display a piece of text information of a plurality of pieces of text information obtained by converting the speech information.

Step S14: receive a selection signal to respond according to selected text information.

Step S14: receive a selection signal to respond according to the selected text information.

Specifically, the user may select by clicking the text information or clicking the word or character in the text information to obtain the selected text information, thus but is not limited to confirming that the information input by the user is the selected text information, and thus making the user input more convenient, solving the problem of the accuracy of speech processing, and increasing the user experience.

Wherein, in the present embodiment, the user may also trigger a language button and select the language of the speech that the user wants to recognize. For example, the language can be but not limited to Chinese (Mandarin and local dialects such as Cantonese, Northeast, Sichuan, etc.), English, French, German and Korean, etc., thereby enabling the speech processing device to recognize the received speech information of the various languages.

According to the speech processing method provided by the embodiment of the present invention, the user can select and confirm by clicking on the displayed text information after the speech information is recognized, so that the selected text information is coincident with the received speech information, thus increasing the accuracy and convenience of the speech processing and providing the user with a good experience effect.

Second Embodiment

Figure 3:
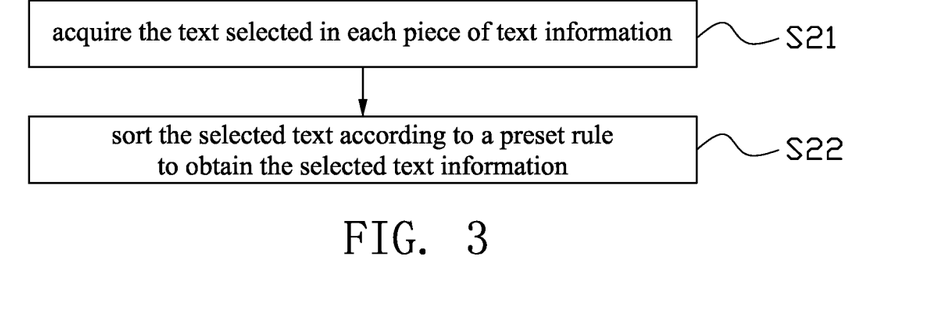
FIG. 3 is a flowchart of a speech processing method provided by the second embodiment of the present invention.

FIG. 3 is a flowchart of a speech processing method provided by the second embodiment of the present invention. The present embodiment is a speech processing method performed by a speech processing device. As shown in FIG. 3, the speech processing method of the present embodiment may include the following steps:

Step S21: acquire a selected text in each piece of text information.

Specifically, in the present embodiment, the display module in the speech processing device simultaneously displays a plurality of pieces of text information. The user can select a text that matches the user's needs in each piece of text information displayed in the speech processing device, and the speech processing device acquires the selected text in each piece of the text information according to the user's selection. For example, if a piece of text information already includes all of the correct words or characters in the speech information inputted by the user, the user can press the text information continuously to acquire the entire text information, but it is not limited thereto.

Step S22: sort the selected text according to a preset rule to obtain the selected text information.

Specifically, in one embodiment, the speech processing device may sort the selected text according to a time rule to obtain the selected text information, but it is not limited thereto. For example, the speech processing device may sort according to the time order of the user selects the text, specifically, a first selected text is placed at the front of the text information and a last selected text is placed at the back of the text information, thus forming the selected text information to quickly and accurately obtain the text information needed by the user.

In another embodiment, the speech processing device may also sort the selected text according to a grammar rule to obtain the selected text information, but it is not limited thereto. For example, the speech processing device may insert the selected text into a different position in the text information based on the characteristic, grammar of the selected text and the anticipation of the sentence structure of the sentence in the speech information, thus forming the selected text information to quickly and accurately obtain the text information needed by the user.

Wherein, in the present embodiment, the user may also trigger a language button and select the language of the speech that the user wants to recognize. For example, the language can be but not limited to Chinese (Mandarin and local dialects such as Cantonese, Northeast, Sichuan, etc.), English, French, German and Korean, etc., thereby enabling the speech processing device to recognize the received speech information of the various languages.

Wherein, the speech processing device communicates with a cloud server, and the speech processing device, when converting the speech information into a plurality of pieces of text information, acquires words or characters related to the speech information from a large database stored in the cloud server to form the plurality of pieces of text information. Wherein, the large database records all the information of newspapers, magazines and websites, thus making the thesaurus in the large database more abundant. Of course, it is understood by those skilled in the art that the words or characters related to the speech information may also be directly stored in the speech processing device.

According to the speech processing method provided by the embodiment of the present invention, the user can select and confirm by clicking on the text in the displayed text information after the speech information is recognized and the selected text is sorted to obtain the selected text information, so that the selected text information is guaranteed to be coincident with the received speech information, thus further increasing the accuracy and convenience of the speech processing and providing the user with a good experience effect.

Third Embodiment

Figure 4:
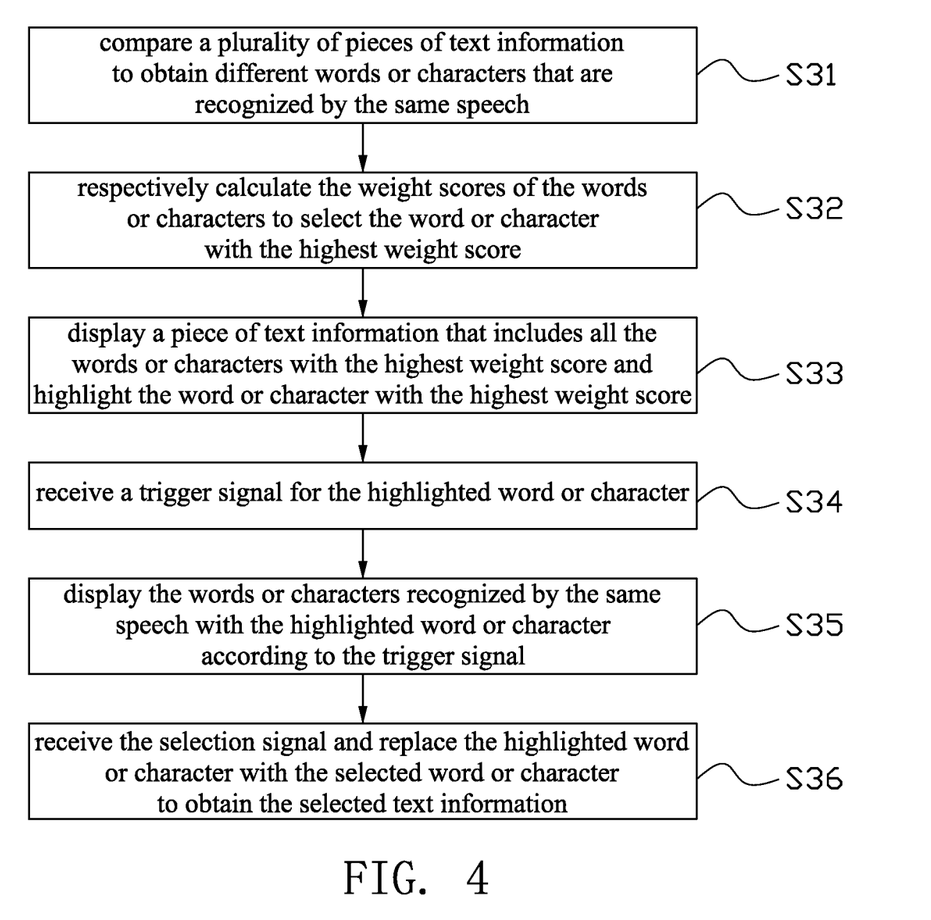
FIG. 4 is a flowchart of a speech processing method provided by the third embodiment of the present invention.

FIG. 4 is a flowchart of a speech processing method provided by the third embodiment of the present invention. The present embodiment is a speech processing method performed by a speech processing device. As shown in FIG. 4, the speech processing method of the present embodiment may include the following steps:

Step S31: compare a plurality of pieces of text information to obtain different words or characters that are recognized from a same speech.

Specifically, in the present embodiment, the speech processing device, after recognizing the received speech information, acquires the text information matching the speech information from the large database in the cloud server. If the statement in the speech information contains the content of words or characters similar in characteristics (such as uncertain words or characters like homophones, homonyms or new-created words etc.), the speech processing device will acquire a plurality of pieces of text information. The speech processing device compares the plurality of pieces of text information to obtain the different words or characters recognized by the same speech in each piece of the text information. For example, the speech processing device performs speech recognition based on the received speech information to obtain a plurality of pieces of text information, such as "the movie that he directs (pronounce "zhidao" in Mandarin) gets a good reflection (pronounce "fanying" in Mandarin) from the audience", "the movie that he guides (pronounce "zhidao" in "zhidao" in Mandarin) gets a good reflection from the audience", and "the movie that he directs gets a good response (pronounce "fanying" in Mandarin) from the audience". Wherein "direct" and "guide" are two different words which are recognized by the same speech and "reflection" and "response" are two different words which are recognized by the same speech, but it is not limited thereto.

Step S32: respectively calculate weight scores of the words or characters to select words or characters with a highest weight score.

Wherein, a weight processing is performed on the words or characters according to at least one item of the frequency of occurrence, the time of occurrence, the authority of source, whether a common word, whether a dialect and whether a number of the words or characters to obtain the weight scores of the words or characters.

Specifically, in one embodiment, the weight processing is performed based on one or more items of the frequency of occurrence, the time of occurrence, the authority of source, whether a common word, whether a dialect and whether a number of the words or characters to obtain the weight scores of the respective words or characters, but it is not limited thereto. For example, in other embodiments, the weight processing may be performed by setting up other conditions. Specifically, in the present embodiment, each item of the frequency of occurrence, the time of occurrence, the authority of source, whether a common word, whether a dialect and whether a number of the words or characters can be preset with a weight score. When a word or character matches one or more above items, the respective weight score is assigned to the word or character, a sum processing is performed to obtain the final weight score of the word or character, and the final weight score is recorded in the weight score list. Specifically, the weight score of a word or character can be updated according to the information in the large database to update the weight score of the word or character in real time, and the updated weight score of the word or character is recorded in the weight score list.

Step S33: display a piece of text information that includes all the words or characters the highest weight score, and highlighting the words or characters with the highest weight score.

Specifically, when the weight score of a word or character in a piece of text information is higher than the weight scores of the words or characters recognized by the same speech in a plurality of pieces of text information respectively, the speech processing device displays the piece of text information including the word or character. At the same time, the word or character that has the highest weight score in the words or characters recognized by the same speech is highlighted.

Step S34: receive a trigger signal for a highlighted word or character.

Specifically, in one embodiment, if the user is not satisfied with a highlighted word or character, the user may click or press the highlighted word or character to generate the trigger signal. The speech processing device receives the trigger signal when detecting that the user clicks or presses the highlighted word or character.

Step S35: display a word or character recognized from same speech with the highlighted word or character according to the trigger signal.

Specifically, for the user to select the desired word or character, the speech processing device displays a plurality of words or characters in a pull-down menu for the triggered words or characters according to the trigger signal.

Step S36: receive a selection signal and replace the highlighted word or character with a selected word or character to obtain the selected text information.

Specifically, the speech processing device replaces the highlighted word or character with the selected word or character according to the received selection signal, so that the selected text information is consistent with the meaning expressed by the received speech information.

Specifically, in one embodiment, the speech processing device performs a speech recognition based on the received speech information to obtain a plurality of pieces of text information, such as "the movie that he directs (pronounce "zhidao" in Mandarin) gets a good reflection (pronounce "fanying" in Mandarin) from the audience", "the movie that he guides (pronounce "zhidao" in Mandarin) gets a good reflection from the audience", and "the movie that he gets a good response (pronounce "fanying" in Mandarin) from the audience". Wherein "direct" and "guide" are two different words which are recognized by the same speech and "reflection" and "response" are two different words which are recognized by the same speech. The speech processing device obtains that the weight score of the "guide" is higher than the weight score of the "direct" after calculating and analyzing the "direct" and "guide" and obtains that the weight score of the "reflection" is higher than the weight score of the "response" after calculating and analyzing the "reflection" and the "response". The speech processing device selects the two words of "guide" and "response" with the highest weight score to obtain the text information of "the movie that he guides gets a good reflection from the audience" which contains all of the words or characters with the highest weight scores. The speech processing device displays the "the movie that he guides gets a good reflection from the audience" and highlights the "guide" and "reflection". If the user feels that the "guide" does not conform to the meaning to be expressed in the speech information after seeing the text information, the user may click on the "guide" to send a trigger signal to the speech processing device. The speech processing device displays a plurality of words or characters that are the same as the "guide" in speech in a pull-down menu according to the trigger signal, for example, the words such as "direct", "know" (pronounce "zhidao" in Mandarin), "the way" (pronounce "zhidao" in Mandarin), and "only to" (pronounce "zhidao" in Mandarin) for the user to select and replace. After the user selects "direct", the speech processing device replaces the "guide" in the text information with "direct" to obtain the selected text information "the movie that he directs gets a good reflection from the audience", but it is not limited thereto.

Wherein, in the present embodiment, the user may also trigger a language button and select the language of the speech that the user wants to recognize. For example, the language can be but not limited to Chinese (Mandarin and local dialects such as Cantonese, Northeast, Sichuan, etc.), English, French, German and Korean, etc., thereby enabling the speech processing device to recognize the received speech information of the various languages.

Wherein, the speech processing device communicates with a cloud server, and the speech processing device, when converting the speech information into a plurality of pieces of text information, acquires words or characters related to the speech information from a large database stored in the cloud server to form the plurality of pieces of text information. Wherein, the large database records all the information of newspapers, magazines and websites, thus making the thesaurus in the large database more abundant. Of course, it is understood by those skilled in the art that the words or characters related to the speech information may also be directly stored in the speech processing device.

According to the speech processing method provided by the embodiment of the present invention, the user can select and replace by clicking on the word or character in the displayed text information after the speech information is recognized to obtain the selected text information, so that the selected text information is guaranteed to be coincident with the received speech information, thus further increasing the accuracy and convenience of the speech processing and providing the user with a good experience effect.

Fourth Embodiment

Figure 5:
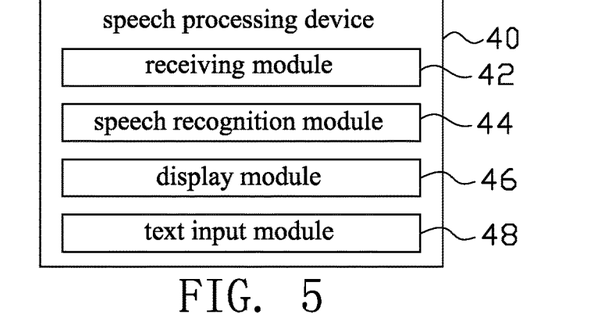
FIG. 5 is a structural block diagram of a speech processing device provided by the fourth embodiment of the present invention.

FIG. 5 is a structural block diagram of a speech processing device 40 provided by the fourth embodiment of the present invention. The speech processing device 40 provided by the present embodiment may be used to implement the speech processing method provided in the first embodiment. As shown in FIG. 5, the speech processing device 40 includes a receiving module 42, a speech recognition module 44, a display module 46 and a text input module 48.

Wherein, the receiving module 42 is used for receiving speech information.

Wherein, the speech recognition module 44 is used for recognizing the speech information to convert the speech information into a plurality of pieces of text information.

Wherein, the display module 46 is used for displaying at least one piece of text information.

Wherein, the text input module 48 is for receiving a selection signal to respond according to selected text information.

Wherein, in the present embodiment, the user may also trigger a language button and select the language of the speech that the user wants to recognize. For example, the language can be but not limited to Chinese (Mandarin and local dialects such as Cantonese, Northeast, Sichuan, etc.), English, French, German and Korean, etc., thereby enabling the speech processing device 40 to recognize the received speech information of the various languages.

Wherein, the speech recognition module 44 of the speech processing device 40 communicates with a cloud server, and the speech processing device 40, when converting the speech information into a plurality of pieces of text information, acquires words or characters related to the speech information from a large database stored in the cloud server to form the plurality of pieces of text information. Specifically, the large database records all the information of newspapers, magazines and websites, thus making the thesaurus in the large database more abundant. Of course, it is understood by those skilled in the art that the words or characters related to the speech information may also be directly stored in the speech processing device 40.

Each of the aforementioned modules may be implemented by software code, in which case each of the modules may be stored in a memory. Each of the aforementioned modules may be implemented by hardware such as an integrated circuit chip.

Please refer to the specific descriptions described in the embodiments shown in above FIGS. 1 to 4 for the specific function of each of the functional units in the speech processing device 40 of the present embodiment, and no redundant detail is to be given herein.

According to the speech processing device 40 provided by the embodiment of the present invention, the user can select and confirm by clicking on the text in the displayed text information after the speech information is recognized and the selected text is sorted to obtain the selected text information, so that the selected text information is guaranteed to be coincident with the received speech information, thus further increasing the accuracy and convenience of the speech processing and providing the user with a good experience effect.

Figure 6:
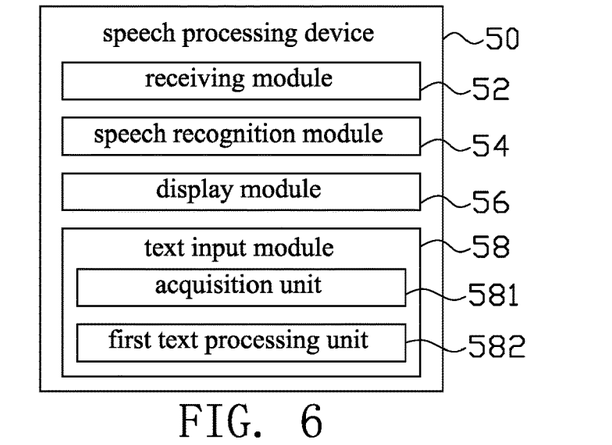
FIG. 6 is a structural block diagram of a speech processing device provided by the fifth embodiment of the present invention.

FIG. 6 is a structural block diagram of a speech processing device 50 provided by the fifth embodiment of the present invention. The speech processing device 50 provided by the present embodiment may be used to implement the speech processing method provided in the second embodiment. As shown in FIG. 6, the speech processing device 50 includes a receiving module 52, a speech recognition module 54, a display module 56 and a text input module 58. Wherein, the text input module 58 includes an acquisition unit 581 and a first text processing unit 582.

Wherein, the receiving module 52 is used for receiving speech information. The speech recognition module 54 is used for recognizing the speech information to convert the speech information into a plurality of pieces of text information. The display module 56 is used for displaying at least one piece of text information. The text input module 58 is used for receiving a selection signal to respond according to the selected text information.

Wherein, the acquisition unit 581 is used for a selected text in each piece of text information.

Wherein, the first text processing unit 582 is used for sorting the selected text according to a preset rule to obtain the selected text information.

Wherein, in the present embodiment, the user may also trigger a language button and select the language of the speech that the user wants to recognize. For example, the language can be but not limited to Chinese (Mandarin and local dialects such as Cantonese, Northeast, Sichuan, etc.), English, French, German and Korean, etc., thereby enabling the speech processing device 50 to recognize the received speech information of the various languages.

Wherein, the speech recognition module 54 of the speech processing device 50 communicates with a cloud server, and the speech processing device 50, when converting the speech information into a plurality of pieces of text information, acquires words or characters related to the speech information from a large database stored in the cloud server to form the plurality of pieces of text information. Specifically, the large database records all the information of newspapers, magazines and websites, thus making the thesaurus in the large database more abundant. Of course, it is understood by those skilled in the art that the words or characters related to the speech information may also be directly stored in the speech processing device 50.

Each of the aforementioned modules may be implemented by software code, in which case each of the modules may be stored in a memory. Each of the aforementioned modules may be implemented by hardware such as an integrated circuit chip.

Please refer to the specific descriptions described in the embodiments shown in above FIGS. 1 to 5 for the specific function of each of the functional units in the speech processing device 50 of the present embodiment, and no redundant detail is to be given herein.

According to the speech processing device 50 provided by the embodiment of the present invention, the user can select and confirm by clicking on the text in the displayed text information after the speech information is recognized and the selected text is sorted to obtain the selected text information, so that the selected text information is guaranteed to be coincident with the received speech information, thus further increasing the accuracy and convenience of the speech processing and providing the user with a good experience effect.

Figure 7:
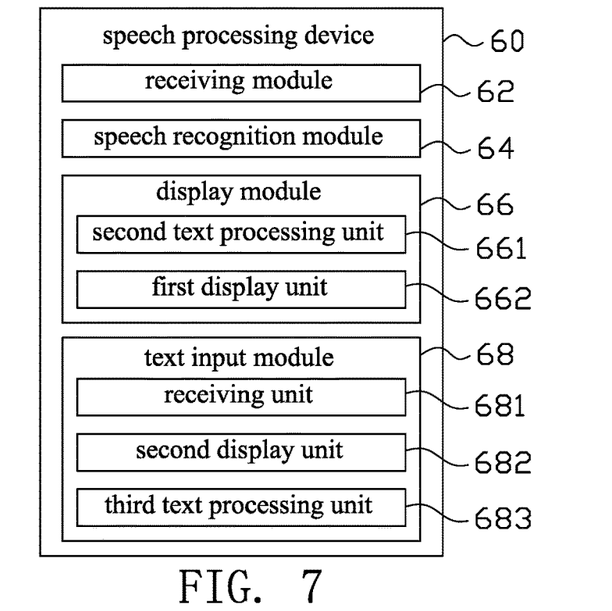
FIG. 7 is a structural block diagram of a speech processing device provided by the sixth embodiment of the present invention.

FIG. 7 is a structural block diagram of a speech processing device 60 provided by the sixth embodiment of the present invention. The speech processing device 60 provided by the present embodiment may be used to implement the speech processing method provided in the third embodiment. As shown in FIG. 7, the speech processing device 60 includes a receiving module 62, a speech recognition module 64, a display module 66 and a text input module 68. Wherein, the display module 66 includes a second text processing unit 661 and a first display unit 662, and the text input module 68 further includes a receiving unit 681, a second display unit 682 and a third text processing unit 683.

Wherein, the receiving module 62 is used for receiving speech information. The speech recognition module 64 is used for recognizing the speech information to convert the speech information into a plurality of pieces of text information. The display module 66 is used for displaying at least one piece of text information. The text input module 68 is used for receiving a selection signal to respond according to a selected text information.

Wherein, the second text processing unit 661 is used for comparing a plurality of pieces of text information to obtain different words or characters that are recognized from the same speech and respectively calculating the weight scores of words or characters to select a word or character with a highest weight score.

Specifically, in the present embodiment, the speech processing device 60, after recognizing the received speech information, acquires the text information matching the speech information from the large database in the cloud server. If the statement in the speech information contains the content of words or characters similar in characteristics (such as uncertain words or characters like homophones, homonyms or new-created words etc.), the speech processing device 60 will acquire a plurality of pieces of text information. The speech processing device 60 compares the plurality of pieces of text information to obtain the different words or characters recognized by the same speech in each piece of the text information, performs a weight processing on all of the words or characters to obtain a weight score light of each word or character and stores the weight score list.

Specifically, in one embodiment, the weight processing is performed based on one at least one item of the frequency of occurrence, the time of occurrence, the authority of source, whether a common word, whether a dialect and whether a number of the words or characters to obtain the weight scores of the respective words or characters, but it is not limited thereto. For example, in other embodiments, the weight processing may be performed by setting up other conditions. Specifically, in the present embodiment, each item of the frequency of occurrence, the time of occurrence, the authority of source, whether a common word, whether a dialect and whether a number of the words or characters can be preset with a weight score. When a word or character matches one or more above items, the respective weight score is assigned to the word or character, a sum processing is performed to obtain the final weight score of the word or character, and the final weight score is recorded in the weight score list. Specifically, the weight score of a word or character can be updated according to the information in the large database to update the weight score of the word or character in real time, and the updated weight score of the word or character is recorded in the weight score list.

Wherein, the first display unit 662 is used for displaying a piece of text information that includes all the words or characters with the highest weight score and highlighting the word or character with the highest weight score.

Wherein, the receiving unit 681 is used for receiving a trigger signal for the a highlighted word or character.

Wherein, the second display unit 682 is used for displaying the words or characters recognized by the same speech with the highlighted word or character according to the trigger signal.

Wherein, the third text processing unit 683 is used for receiving a selection signal and replacing the highlighted word or character with the selected word or character to obtain the selected text information.

Wherein, in the present embodiment, the user may also trigger a language button and select the language of the speech that the user wants to recognize. For example, the language can be but not limited to Chinese (Mandarin and local dialects such as Cantonese, Northeast, Sichuan, etc.), English, French, German and Korean, etc., thereby enabling the speech processing device 60 to recognize the received speech information of the various languages.

Wherein, the speech recognition module 64 of the speech processing device 60 communicates with a cloud server, and the speech processing device 60, when converting the speech information into a plurality of pieces of text information, acquires words or characters related to the speech information from a large database stored in the cloud server to form the plurality of pieces of text information. Specifically, the large database records all the information of newspapers, magazines and websites, thus making the thesaurus in the large database more abundant. Of course, it is understood by those skilled in the art that the words or characters related to the speech information may also be directly stored in the speech processing device 60.

Each of the aforementioned modules may be implemented by software code, in which case each of the modules may be stored in a memory. Each of the aforementioned modules may be implemented by hardware such as an integrated circuit chip.

Please refer to the specific descriptions described in the embodiments shown in above FIGS. 1 to 6 for the specific function of each of the functional units in the speech processing device 60 of the present embodiment, and no redundant detail is to be given herein.

According to the speech processing device 60 provided by the embodiment of the present invention, the user can select and replace by clicking on the word or character in the displayed text information after the speech information is recognized to obtain the selected text information, so that the selected text information is guaranteed to be coincident with the received speech information, thus further increasing the accuracy and convenience of the speech processing and providing the user with a good experience effect.

It is to be noted that each of the embodiments in the present specification is described in a progressive manner. Each embodiment is focused on the differences from other embodiments, and the same or similar parts between the various embodiments may be referred to each other. For the device embodiment, since it is substantially similar to the corresponding method embodiment, the description is relatively simple and the relevant part is described in part of the method embodiment.

It is to be noted that, in this specification, relational terms such as first and second terms are used only to distinguish an entity or an operation from another entity or operation without necessarily requiring or implying that any such actual relationship or order between the entities or operations. Moreover, the term "include", "comprise" or any other variant thereof is intended to encompass a non-exclusive inclusion, such that the process, method, article or device that includes a series of elements includes not only those elements but also those that are not explicitly listed or other elements that are inherent to such process, method, article or device. In the absence of more restrictions, the elements defined by the statement "including a . . . " do not exclude the presence of additional elements in the process, method, article or device that includes the elements.

The general technical person can understand all or part of the steps of the embodiment can be accomplished by hardware or can be accomplished by instructing related hardware by programs. The program can be stored in a computer readable storage medium, and the storage medium can be read only memory, disk or CD etc.

Above is only a preferred embodiment of the present invention and is not any restriction on the form of the present invention. While the present invention has been described above with reference to preferred embodiments, it is not intended to limit the invention. Any person skilled in the art may make a slight alteration or modification as an equivalent embodiment of equivalent variations by using the technical contents disclosed above without departing from the scope of the technical solution of the present invention. It is still within the scope of the technical solution of the present invention to make any simple modifications, equivalent variations and modifications to the above embodiments in accordance with the technical details of the present invention without departing from the scope of the technical solutions of the present invention.

What is claimed is:

1. A speech processing method, the method comprises:
receiving speech information;
recognizing the speech information to convert the speech information into a plurality of pieces of text information;
displaying a plurality of pieces of the text information; and
receiving a selection signal to respond according to selected text information;
wherein a step of receiving a selection signal to respond according to the selected text information comprises:
acquiring a selected text in each piece of text information; and
sorting the selected text according to a preset rule to obtain the selected text information.

2. The method according to claim 1, wherein a step of displaying at least one piece of text information comprises:

comparing the plurality of pieces of text information to obtain different words or characters that are recognized from a same speech;

respectively calculating weight scores of the words or characters to select words or characters with a highest weight score; and displaying a piece of text information comprising all of the words or characters with the highest weight score, and highlighting the words or characters with the highest weight score.

3. The method according to claim 2, wherein a step of displaying at least one piece of text information further comprises:

receiving a trigger signal for a highlighted word or character;

displaying a word or character recognized from the same speech with the highlighted word or character according to the trigger signal; and receiving a selection signal and replacing the highlighted word or character with a selected word or character to obtain the selected text information.

4. The method according to claim 2, wherein a weight processing is performed on the words or characters based on at least one item of a frequency of occurrence, a time of occurrence, an authority of source, whether a common word, whether a dialect and whether a number, to obtain the weight scores of the words or characters.

5. A memory, used for storing software programs corresponding to a speech processing method, and when a processor executes running the software programs, speech processing method of claim 1 can be implemented.

6. A speech processing device, wherein the device comprises:

a receiving module, for receiving speech information;

a speech recognition module, for recognizing the speech information to convert the speech information into a plurality of pieces of text information;

a display module, for displaying a plurality of pieces of the text information; and a text input module, for receiving a selection signal to respond according to selected text information;

wherein the text input module is further configured to acquire a selected text in each piece of text information, and sort the selected text according to a preset rule to obtain the selected text information.

7. The speech processing device according to claim 6, wherein the text input module comprises:

an acquisition unit, for acquiring a selected text in each piece of text information; and a first text processing unit, for sorting the selected text according to a preset rule to obtain the selected text information.

8. The speech processing device according to claim 6, wherein the display module comprises:

a second text processing unit, for comparing the plurality of pieces of text information to obtain different words or characters that are recognized from a same speech and respectively calculating weight scores of the words or characters to select words or characters with a highest weight score; and a first display unit, for displaying a piece of text information comprising all of the words or characters with the highest weight score, and highlighting the words or characters with the highest weight score.

9. The speech processing device according to claim 8, wherein the text input module comprises:

a receiving unit, for receiving a trigger signal for a highlighted word or character;

a second display unit, for displaying words or characters recognized by the same speech with the highlighted word or character according to the trigger signal; and a third text processing unit, for receiving a selection signal and replacing the highlighted word or character with a selected word or character to obtain the selected text information.

10. The speech processing device according to claim 8, wherein a weight processing is performed on the words or characters based on at least one item of a frequency of occurrence, a time of occurrence, an authority of source, whether a common word, whether a dialect and whether a number, to obtain the weight scores of the words or characters.

11. A terminal, comprising;

a processor; and a memory communicatively coupled to the processor and storing instructions that upon execution by the processor cause the terminal to:

receive speech information;

recognize the speech information to convert the speech information into a plurality of pieces of text information;

displaying a plurality of pieces of the text information; and receiving a selection signal to respond according to selected text information;

wherein the memory further storing instructions that upon execution by the processor cause the terminal to:

acquire a selected text in each piece of text information; and sort the selected text according to a preset rule to obtain the selected text information.

12. The terminal of claim 11, the memory further storing instructions that upon execution by the processor cause the terminal to:

compare the plurality of pieces of text information to obtain different words or characters that are recognized from a same speech;

respectively calculate weight scores of the words or characters to select words or characters with the highest weight score; and display a piece of text information comprising all of the words or characters with a highest weight score, and highlighting the words or characters with the highest weight score.

13. The terminal of claim 12, the memory further storing instructions that upon execution by the processor cause the terminal to:

receive a trigger signal for the highlighted word or character;

display words or characters recognized from the same speech with the highlighted word or character according to the trigger signal; and receive a selection signal and replacing the highlighted word or character with a selected word or character to obtain the selected text information.

14. The terminal of claim 11, wherein a weight processing is performed on the words or characters based on at least one item of a frequency of occurrence, a time of occurrence, an authority of source, whether a common word, whether a dialect and whether a number, to obtain the weight scores of the words or characters.

* * * * *